US009440309B2

(12) United States Patent
Park et al.

(10) Patent No.: US 9,440,309 B2
(45) Date of Patent: Sep. 13, 2016

(54) APPARATUS FOR LASER PROCESSING A LIGHT GUIDE PLATE AND HAVING CONSTANT LIGHT PATH DISTANCE OF A LASER BEAM

(75) Inventors: Hae Kwang Park, Suwon-Si (KR); Ho Yeon Lee, Suwon-Si (KR)

(73) Assignee: LASERLIGHTING, Suwon-Si, Gyeonggi-Do (KR)

( * ) Notice: Subject to any disclaimer, the term of this patent is extended or adjusted under 35 U.S.C. 154(b) by 900 days.

(21) Appl. No.: 13/808,827

(22) PCT Filed: Jul. 1, 2011

(86) PCT No.: PCT/KR2011/004846
§ 371 (c)(1), (2), (4) Date: Mar. 7, 2013

(87) PCT Pub. No.: WO2012/005479
PCT Pub. Date: Jan. 12, 2012

(65) Prior Publication Data

US 2013/0153546 A1 Jun. 20, 2013

(30) Foreign Application Priority Data

Jul. 7, 2010 (KR) ........................ 10-2010-0065320

(51) Int. Cl.
*B23K 26/00* (2014.01)
*B23K 26/02* (2014.01)
*B23K 26/08* (2014.01)

(52) U.S. Cl.
CPC ........... *B23K 26/0066* (2013.01); *B23K 26/02* (2013.01); *B23K 26/0876* (2013.01)

(58) Field of Classification Search
CPC combination set(s) only.
See application file for complete search history.

(56) References Cited

U.S. PATENT DOCUMENTS 7,478,942 B2 * 1/2009 Kim ..................... G02B 6/0036 349/65
2003/0035219 A1 * 2/2003 Tanaka .................. G02B 27/09 359/618
2003/0210539 A1 * 11/2003 Park ..................... G02B 6/0036 362/602
2005/0036320 A1 * 2/2005 Park ..................... G02B 6/0036 362/331
2007/0051869 A1 * 3/2007 Knebel .............. G02B 21/0032 250/201.3
2008/0019405 A1 * 1/2008 Kurita .................... B23K 26/04 372/35
2009/0021948 A1 * 1/2009 Kim ..................... G02B 6/0028 362/310
2009/0224777 A1 * 9/2009 Kim ...................... G02F 1/1309 324/760.01
2011/0050655 A1 * 3/2011 Mukawa ............ G02B 27/0172 345/204

FOREIGN PATENT DOCUMENTS

KR 10-04396790000 7/2004
KR 10-04607900000 12/2004

(Continued)

*Primary Examiner* — Dana Ross
*Assistant Examiner* — Renee L Larose
(74) *Attorney, Agent, or Firm* — Morgan, Lewis & Bockius LLP; Jeffry S. Mann

(57) ABSTRACT

Provided is a laser processing apparatus for a light guide plate capable of providing a high-quality light guide plate by maintaining a light path at a constant level. The laser processing apparatus includes a plurality of reflecting mirrors that reflect a laser mirror; and a path adjustment block transported in a direction a distance of the light path is reduced when a laser emitting unit is transported in a direction in which the distance of the light path is increased, wherein at least one of the plurality of reflecting mirrors is installed in the path adjustment block, thereby maintaining the distance of the entire light path on which the laser beam propagates at a constant level.

7 Claims, 8 Drawing Sheets

110(120) 140(130) 50 150 300 40 10 10

(56) References Cited

FOREIGN PATENT DOCUMENTS

KR 10-06417160000 10/2006
KR 10-08140080000 3/2008
KR 10-09575350000 11/2010

* cited by examiner (a)

(b)

Prior Art

APPARATUS FOR LASER PROCESSING A LIGHT GUIDE PLATE AND HAVING CONSTANT LIGHT PATH DISTANCE OF A LASER BEAM

TECHNICAL FIELD

The present disclosure relates to processing of a light guide plate for a liquid crystal display, and more particularly, to a laser processing apparatus for a light guide plate capable of providing a high-quality light guide plate by maintaining a light path at a constant level during processing of the light guide plate with a laser.

BACKGROUND ART

A liquid crystal display (LCD) does not have self-luminescent properties and thus needs an additional light-emitting source. Such a light emitting source is disposed at the rear surface of a liquid crystal panel to cause light to be transmitted by the liquid crystal panel and be emitted, and thus the light emitting source is commonly called a back light unit (BLU).

A back light unit that functions as a planar light source is ideal. However, it is technically difficult to implement a planar light source having a uniform luminance over the entire surface. Therefore, a method of diffusing light emitted by a light source similar to a linear light source or a point light source such as a cold-cathode fluorescent lamp (CCFL) or a light-emitting diode (LED) to be adjusted to a state close to the planar light source is used. Here, a light guide plate (LGP) has an important role in diffusing the light.

The light guide plate is a plate material typically made of an acrylic resin and has a predetermined pattern formed so that light emitted by a light source disposed at the side surface or the bottom surface is uniformly diffused to the front surface. The pattern achieves a desired object by reflecting or refracting the light. According to the form of the pattern, luminance uniformity of the entire surface of the light guide plate is determined. Therefore, more complex and precise patterns are required of the light guide plate, and a reduction in time taken to form the patterns has emerged as an urgent issue with an increase in the area of a display apparatus.

In order to solve the problems, techniques of forming a pattern on an acrylic plate material using a laser beam have been developed.

FIG. 8 is a schematic plan view illustrating an example of a laser processing apparatus for a light guide plate, which forms a pattern on the light guide plate using a laser according to the related art, and illustrates a diagram of Korean Patent No. 460790.

The laser processing apparatus for light guide plate according to the related art includes: a Y-axis guide rail 62 which is relatively fixed; an X-axis guide rail 61 which moves along the Y-axis guide rail; a first mirror 58 fixed to the X-axis guide rail; and a second mirror 59 which moves along the X-axis guide rail. In this configuration, when a laser system 53 emits a laser beam toward the first mirror 58, the laser beam is reflected by the first mirror 58 toward the second mirror 59, and the laser beam that is reflected again by the second mirror 59 reaches a light guide plate 41 positioned below the second mirror 59, thereby forming a predetermined light guide pattern portion 45 on the light guide plate 41.

In order to form the light guide pattern portion 45 over the entire surface of the light guide plate 41, the X-axis guide rail 61 and the first mirror 58 fixed thereto have to move along the Y-axis guide rail 62, and the second mirror 59 has to move along the X-axis guide rail 61. On the other hand, since the laser system 53 and the light guide plate 41 maintain the relatively fixed positions, the light path of the laser beam from the laser system 53 and the light guide plate 41 is frequently changed.

When the light path of the laser beam is changed as described above, the cross-sectional diameter of the laser beam is changed when the laser beam reaches the light guide plate 41. For example, when the light path is lengthened, the laser beam is further diffused, and thus the cross-sectional diameter thereof is also increased. A change in the cross-sectional diameter of the laser beam changes the size of the light guide pattern portion 45, and also changes the depth of light guide pattern portion 45 due to a reduction in energy density. As a result, a pattern having sizes and depths different from those of the pattern to be formed is formed on the light guide plate. Therefore, there is a problem in that the quality uniformity of a completely processed light guide plate is degraded.

BRIEF SUMMARY OF THE INVENTION

The present disclosure is directed to providing a laser processing apparatus for a light guide plate capable of forming a uniform pattern over the entire surface of a light guide plate by maintaining a light path of a laser beam at a constant level.

The present disclosure is also directed to providing a laser processing apparatus for a light guide plate capable of facilitating not only a manufacturing process but also maintenance by maintaining a light path at a constant level with a simple structure and a control system.

Other objects, specific advantages, and new characteristics of the present disclosure will be apparent from the following best mode and the exemplary embodiments associated with the accompanying drawings.

In one general aspect, the present disclosure provides a laser processing apparatus for a light guide plate including: a frame; a laser oscillating unit which generates a laser beam and is installed to be fixed to the frame; a laser emitting unit which is transported to linearly reciprocate on the frame, and receives the laser beam from the laser oscillating unit to emit the laser beam and form a predetermined pattern on a light guide plate which is a processing object; a laser transmitting unit which forms a transmission path of the laser beam between the laser emitting unit and the laser oscillating unit; and a transport surface plate which is transported to linearly reciprocate in a direction intersecting a transport direction of the laser emitting unit on the frame and supports the light guide plate which is the processing object, wherein the laser transmitting unit includes a plurality of reflecting mirrors that reflect the laser beam and a path adjustment block that is transported in a direction in which a distance of the light path is reduced when the laser emitting unit are transported in a direction in which the distance of the light path is increased, and at least one of the plurality of reflecting mirrors being installed in the path adjustment block.

As described above, the distance of the entire light path on which the laser beam propagates may be maintained at a constant level due to the relative transport between the laser emitting unit and the path adjustment block.

In the laser processing apparatus for a light guide plate according to the aspect, the path adjustment block of the laser transmitting unit may be transported in the opposite direction on a straight line parallel to the transport direction of the laser emitting unit, assuming that a propagation direction of the laser beam is 0°, the plurality of reflecting mirrors of the laser transmitting unit may include a first reflecting mirror that is installed on the frame and reflects the laser beam emitted by the laser oscillating unit in a −90° direction, a second reflecting mirror that is installed in the path adjustment block and reflects the laser beam from the first reflecting mirror in a +90° direction, a third reflecting mirror that is installed in the path adjustment block and reflects the laser beam from the second reflecting mirror in the +90° direction, a fourth reflecting mirror that is installed on the frame and reflects the laser beam from the third reflecting mirror in the −90° direction, a fifth reflecting mirror that is installed on the frame and reflects the laser beam from the fourth reflecting mirror in the −90° direction, and a sixth reflecting mirror that is installed in the laser emitting unit and reflects the laser beam from the fifth reflecting mirror in the +90° direction, and the first, second, third, fourth, and fifth reflecting mirrors may reflect the laser beam in the same single plane, and the sixth reflecting mirror may reflect the laser beam in a plane perpendicular to the plane.

In the laser processing apparatus for a light guide plate according to the aspect, the path adjustment block of the laser transmitting unit may be transported in the same direction on the same straight line as the laser emitting unit, assuming that a propagation direction of the laser beam is 0°, the plurality of reflecting mirrors of the laser transmitting unit may include a first reflecting mirror that is installed on the frame and reflects the laser beam emitted by the laser oscillating unit in a +90° direction, a second reflecting mirror that is installed in the path adjustment block and reflects the laser beam from the first reflecting mirror in a −90° direction, a third reflecting mirror that is installed in the path adjustment block and reflects the laser beam from the second reflecting mirror in the −90° direction, and a fourth reflecting mirror that is installed in the laser emitting unit and reflects the laser beam from the third reflecting mirror in the +90° direction, and the first, second, and third reflecting mirrors may reflect the laser beam in the same single plane, and the fourth reflecting mirror may reflect the laser beam in a plane perpendicular to the plane.

In the laser processing apparatus for a light guide plate according to the aspect, the path adjustment block of the laser transmitting unit may be transported on a straight line at a right angle to the transport direction of the laser emitting unit, assuming that a propagation direction of the laser beam is 0°, the plurality of reflecting mirrors of the laser transmitting unit may include a first reflecting mirror that is installed in the path adjustment block and reflects the laser beam from the laser oscillating unit in a −90° direction, a second reflecting mirror that is installed in the path adjustment block and reflects the laser beam from the first reflecting mirror in the −90° direction, a third reflecting mirror that is installed on the frame and reflects the laser beam from the second reflecting mirror in a +90° direction, and a fourth reflecting mirror that is installed in the laser emitting unit and reflects the laser beam from the third reflecting mirror in the +90° direction, and the first, second, and third reflecting mirrors may reflect the laser beam in the same single plane, and the fourth reflecting mirror may reflect the laser beam in a plane perpendicular to the plane.

In the laser processing apparatus for a light guide plate according to the aspect, a transport speed of the path adjustment block may be ½ of a transport speed of the laser emitting unit.

In the laser processing apparatus for a light guide plate according to the aspect, each of the laser emitting unit and the path adjustment block may be transported by one driving method selected from a belt drive, a ball screw drive, a rack and pinion drive, and a drive using a linear motor.

In the laser processing apparatus for a light guide plate according to the aspect, each of the laser emitting unit and the path adjustment block may be transported by being fixed to a timing belt suspended between a pair of pulleys. Furthermore, a driving belt to which the laser emitting unit is fixed may be suspended between a first pulley and a second pulley, a driven belt to which the path adjustment block is fixed may be suspended between a third pulley and a fourth pulley, the first pulley may be driven to rotate by a driving motor, the second pulley and the third pulley may be rotated integrally, a diameter of the second pulley may be two times a diameter of the third pulley, a distance between the third pulley and the fourth pulley may be equal to or greater than ½ of a distance between the first pulley and the second pulley, and the laser emitting unit and the path adjustment block may be respectively fixed to a tight side of the driving belt and a right side of the driven belt, or may be respectively fixed to a slack side of the driving belt and a slack side of the driven belt.

According to the aspect, the light path of the laser beam from the laser oscillating unit is able to be maintained at a constant level even though the laser emitting unit is moved. As a result, it is possible to form a uniform and accurate pattern over the entire surface of the light guide plate.

In addition, the path adjustment block for adjusting the light path of the laser is transported to linearly reciprocate by being linked with the laser emitting unit. Therefore, it is possible to maintain the light path at a constant level with only a simple driving system and a control system. Therefore, manufacturing the laser processing apparatus for a light guide plate according to the aspect naturally results in significant reductions in effort, time, and cost for maintenance.

BRIEF DESCRIPTION OF DRAWINGS

The above and other objects, features and advantages of the present disclosure will become apparent from the following description of certain exemplary embodiments given in conjunction with the accompanying drawings, in which.

EXAMPLES

Hereinafter, exemplary embodiments of a laser processing apparatus for a light guide plate according to the present disclosure will be described in detail with reference to the accompanying drawings.

Figure 1:
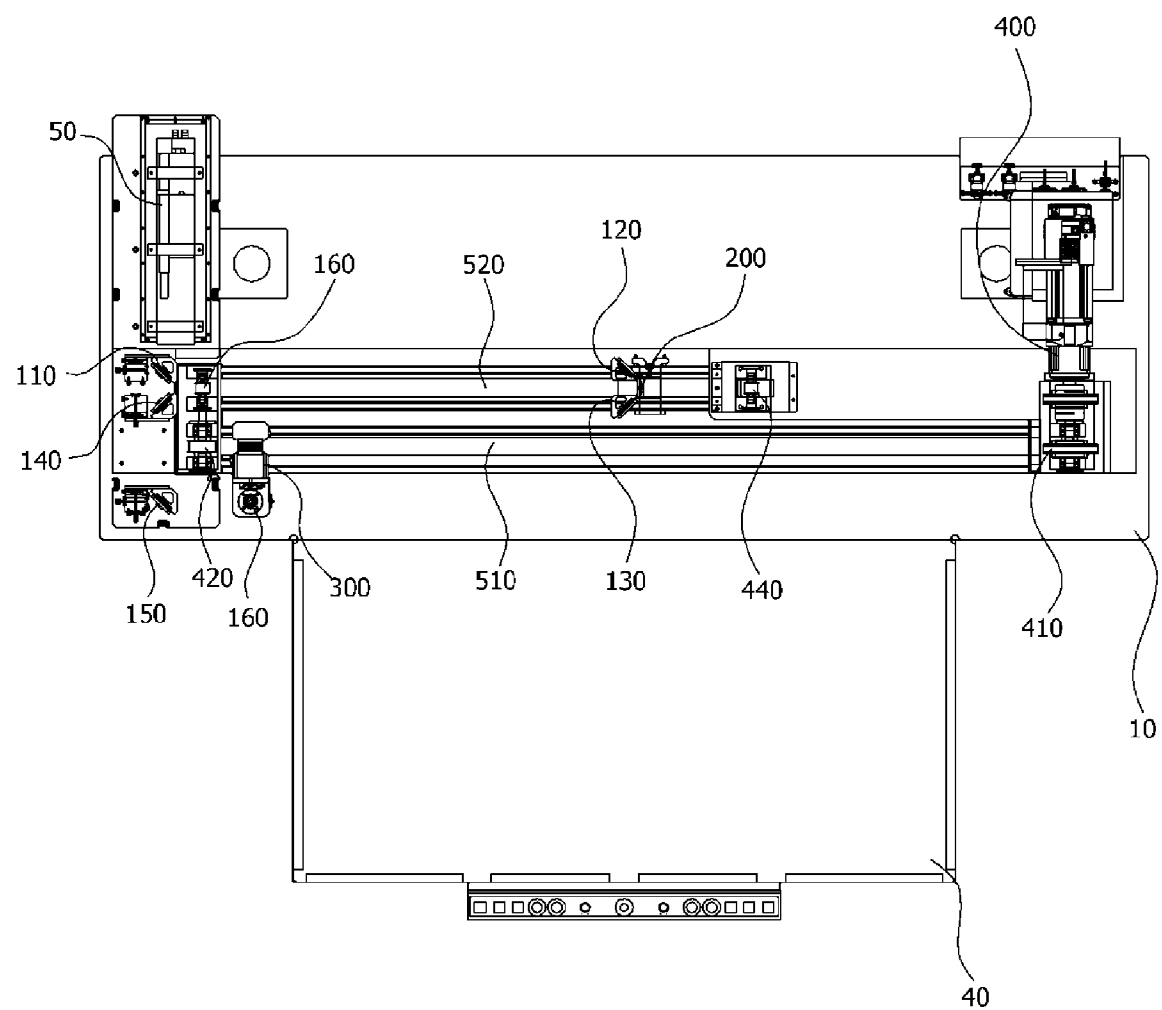
FIG. 1 is a plan view of a first embodiment of a laser processing apparatus for a light guide plate according to the present disclosure.
Figure 2:
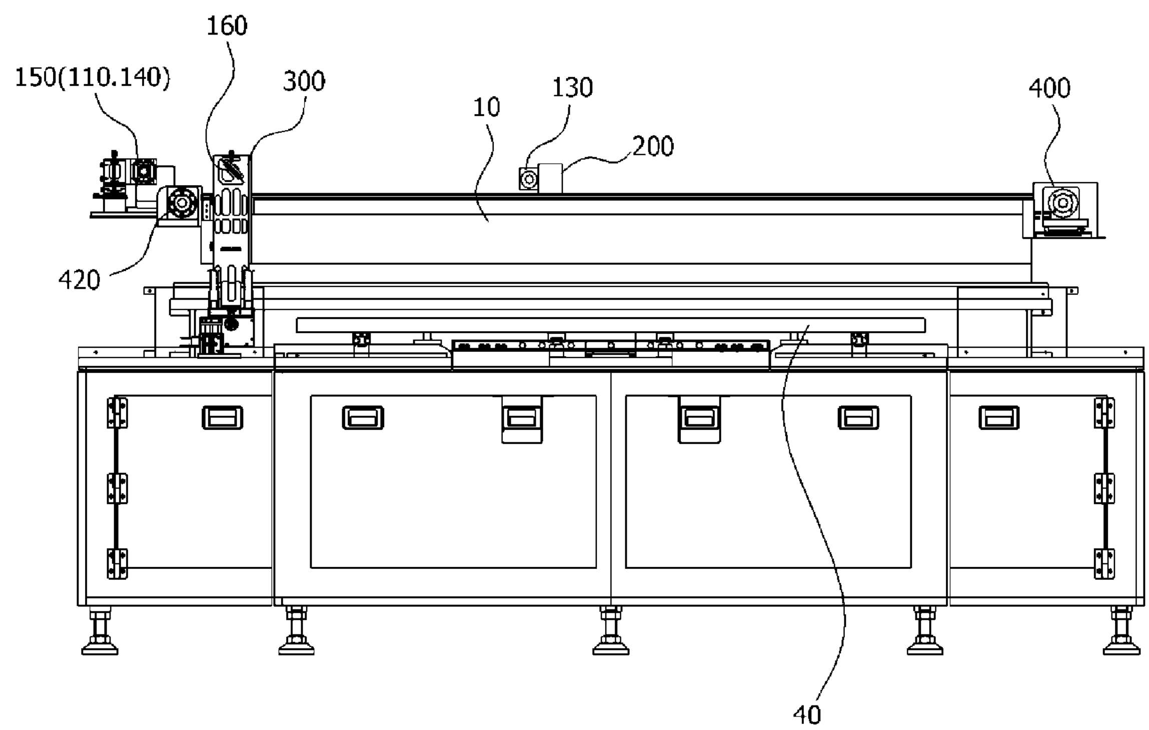
FIG. 2 is a front view of the embodiment of FIG. 1.
Figure 3:
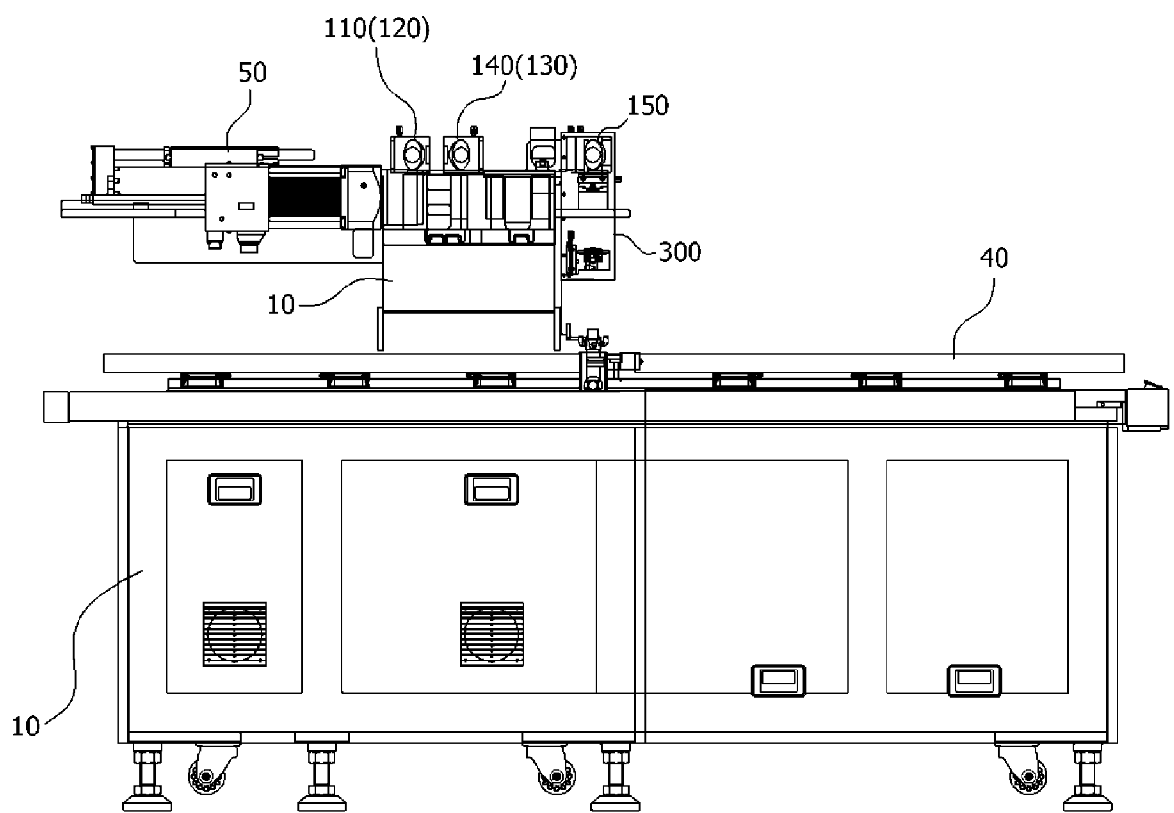
FIG. 3 is a left side view of the embodiment of FIG. 1.
Figure 4:
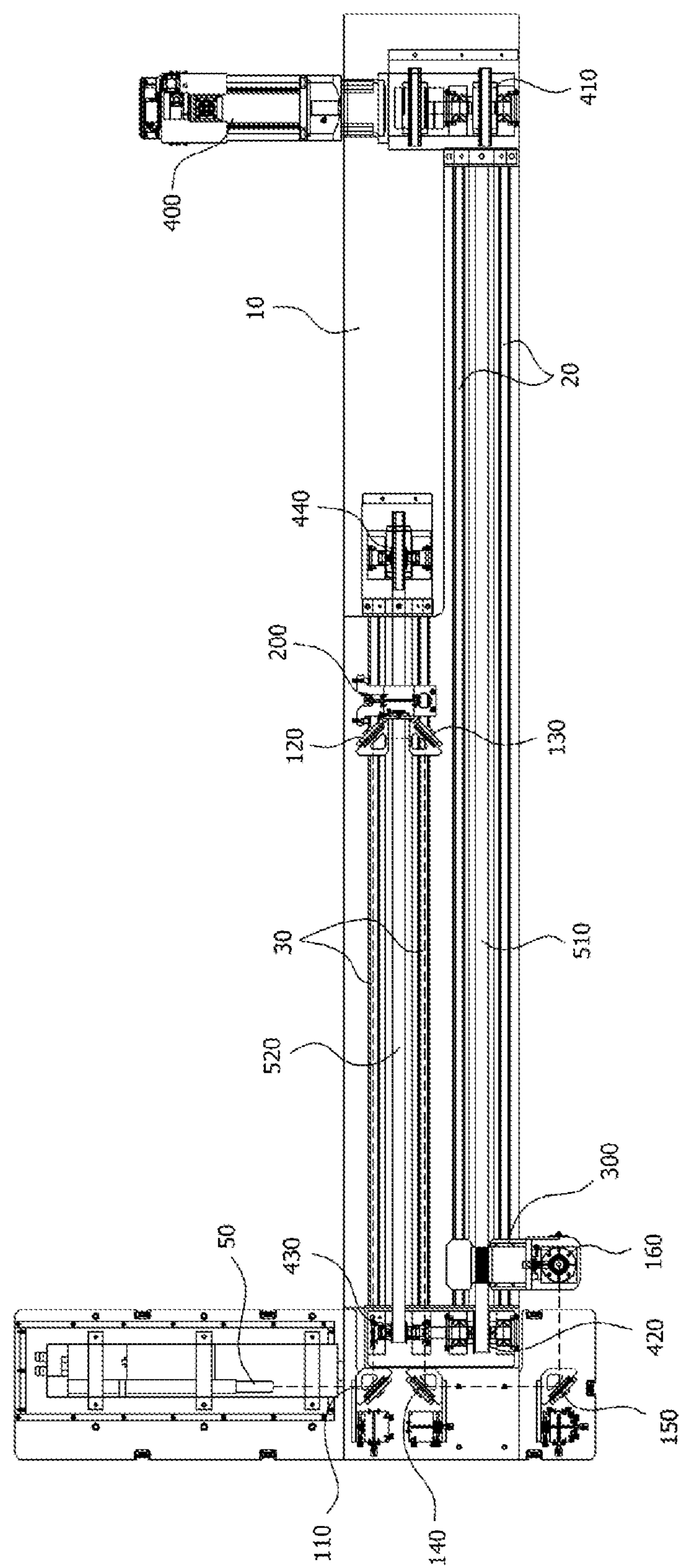
FIG. 4 is a detailed plan view of the embodiment of FIG. 1.

FIG. 1 is a plan view of a first embodiment of the laser processing apparatus for a light guide plate according to the present disclosure, FIG. 2 is a front view of the embodiment of FIG. 1, FIG. 3 is a left side view of the embodiment of FIG. 1, and FIG. 4 is a detailed plan view of the embodiment of FIG. 1.

A frame 10 is for supporting other components and the form, the material, and the structure thereof may be implemented as needed according to the related art.

A laser oscillating unit 50 generates a laser beam so as to be emitted, and the laser beam finally reaches a laser emitting unit 300 and illuminates a processing object such as an acrylic plate so that a predetermined optical pattern is formed on the acrylic plate. As a result, the acrylic plate may be produced as a light guide plate. The laser oscillating unit 50 is installed to be fixed to the frame 10.

The laser emitting unit 300 receives the laser beam emitted by the laser oscillating unit 50 to allow the laser beam to illuminate the acrylic plate and the like. In order to enable the laser beam to illuminate the entire surface of the acrylic plate, the laser emitting unit 300 is installed to be transported to linearly reciprocate in one direction with respect to the frame 10. Meanwhile, the acrylic plate which is the processing object is transported in a direction at a substantially right angle to the transport direction of the laser emitting unit 300, and thus the pattern is able to be formed over the entire surface of the acrylic plate. Therefore, a transport surface plate 40 that supports the acrylic plate which is the processing object is installed to be transported to linearly reciprocate with respect to the frame 10.

A laser transmitting unit is provided to properly transmit the laser beam from the laser oscillating unit 50 installed to be fixed to the frame 10 as described above to the laser emitting unit 300 transported to linearly reciprocate with respect to the frame 10. The laser transmitting unit includes a plurality of reflecting mirrors 110, 120, 130, 140, 150, 160 and a path adjustment block 200.

In the example illustrated in FIG. 1 to FIG. 4, a total of six reflecting mirrors 110, 120, 130, 140, 150, 160 are included, which are the first reflecting mirror 110 to the sixth reflecting mirror 160. In addition, the path adjustment block 200 is installed to be transported to linearly reciprocate along a line approximately parallel to the transport direction of the laser emitting unit 300, and the second reflecting mirror 120 and the third reflecting mirror 130 are installed in the path adjustment block 200. The sixth reflecting mirror 160 is installed in the laser emitting unit 300 and the first, fourth, and fifth reflecting mirrors 110, 140, 150 are installed on the frame 10.

The entire light path of the laser beam from the laser oscillating unit 50 to the laser emitting unit 300 will be described in detail with respect to the directions in the detailed plan view illustrated in FIG. 4 through the arrangement relationship between the reflecting mirrors 110, 120, 130, 140, 150, 160. First, the laser oscillating unit 50 is disposed at the upper left end of the frame 10 and emits the laser beam toward the lower side in the figure, and the first reflecting mirror 110 is positioned at the front end of the laser oscillating unit 50 and reflects the laser beam at a right angle. Assuming that the propagation direction in which the laser beam is incident on the first reflecting mirror 110 is 0°, the first reflecting mirror 110 changes the direction of the laser beam to a −90° direction for propagation. Here, the (−) sign in front of a numerical value indicates a change in direction to a counterclockwise direction and the (+) sign indicates a change in direction to a clockwise direction.

The laser beam of which the direction is changed to the −90° propagation direction by the first reflecting mirror 110 reaches the second reflecting mirror 120, and the second reflecting mirror 120 changes the propagation direction of the laser beam to a +90° direction to allow the laser beam to propagate toward the third reflecting mirror 130. The third reflecting mirror 130 changes the propagation direction of the laser beam again to the +90° direction to allow the laser beam to propagate toward the fourth reflecting mirror 140, the fourth reflecting mirror 140 changes the direction of the laser beam path to the −90° direction to allow the laser beam to propagate toward the fifth reflecting mirror 150, the fifth reflecting mirror 150 also changes the direction of the laser beam path to the −90° direction to allow the laser beam to propagate toward the sixth reflecting mirror 160, and the sixth reflecting mirror 160 changes the direction of the laser beam path to a vertically downward direction to allow the laser beam to propagate toward the acrylic plate which is the processing object. In the above description, the laser beam is reflected by each of the reflecting mirrors in the same single plane until the laser beam reaches the fifth reflecting mirror 150 from the first reflecting mirror 110. However, the laser beam is allowed to propagate in a plane perpendicular to the plane by the sixth reflecting mirror 160. That is, all the reflections of the laser beam by the first reflecting mirror 110 to the fifth reflecting mirror 150 in FIG. 4 are achieved in the same plane as that of the figure. However, the reflection by the sixth reflecting mirror 160 is achieved in a direction that vertically penetrates through the figure from the above to the below. This is because the reflection by the sixth reflecting mirror 160 is to finally induce the laser beam to the processing object, while the reflections by the first to the fifth reflecting mirrors 110 to 150 are to adjust the light path distance of the laser beam.

In the above description, a value obtained by adding the angles of reflections by the first to the fifth reflecting mirrors 110 to 150 is (−90°)+(+90°)+(+90°)+(−90°)+(−90°)=(−90°), which means that the laser beam incident on the laser emitting unit 300 propagates in the −90° direction, that is, in the leftward direction at a right angle when it is assumed that the direction of the laser beam emitted by the laser oscillating unit 50 is at 0°. Therefore, if the laser oscillating unit 50 is disposed at a different position in advance, the sum of angles and the number of reflecting mirrors may be changed. For example, in a case where the laser oscillating unit 50 emits a laser in the leftward direction at a point that is parallel to the transport path of the laser emitting unit 300 and is positioned thereabove with respect to the directions in FIG. 4, an additional reflecting mirror that is disposed above the first reflecting mirror 110 to change the direction of the laser beam to the −90° direction and allow the laser beam to propagate toward the first reflecting mirror 110 is needed, and the sum of angles of changes in directions at the reflecting mirrors becomes −180° (this value is consequently the same value as +180°, but the sign is added in consideration of the process of changing the directions).

In this configuration, when the laser emitting unit 300 is transported to the right with respect to the direction in FIG. 4, the distance between the fifth and sixth reflecting mirrors 150 and 160 is increased. At this moment, when the path adjustment block 200 is transported to the left with respect to the figure, the distance between the first and second reflecting mirrors 110 and 120 and the distance between the third and fourth reflecting mirrors 130 and 140 are reduced. Therefore, while the laser emitting unit 300 is transported at an arbitrary speed, when the path adjustment block 200 is transported at ½ of the speed in the opposite direction, the entire light path distance from the first reflecting mirror 110 to the sixth reflecting mirror 160 may be maintained at a constant level. In this aspect, it can be seen that, at least ½ or greater of the entire distance by which the laser emitting unit 300 is transported is sufficient for the entire range in which the path adjustment block 200 is able to be transported.

Figure 5:
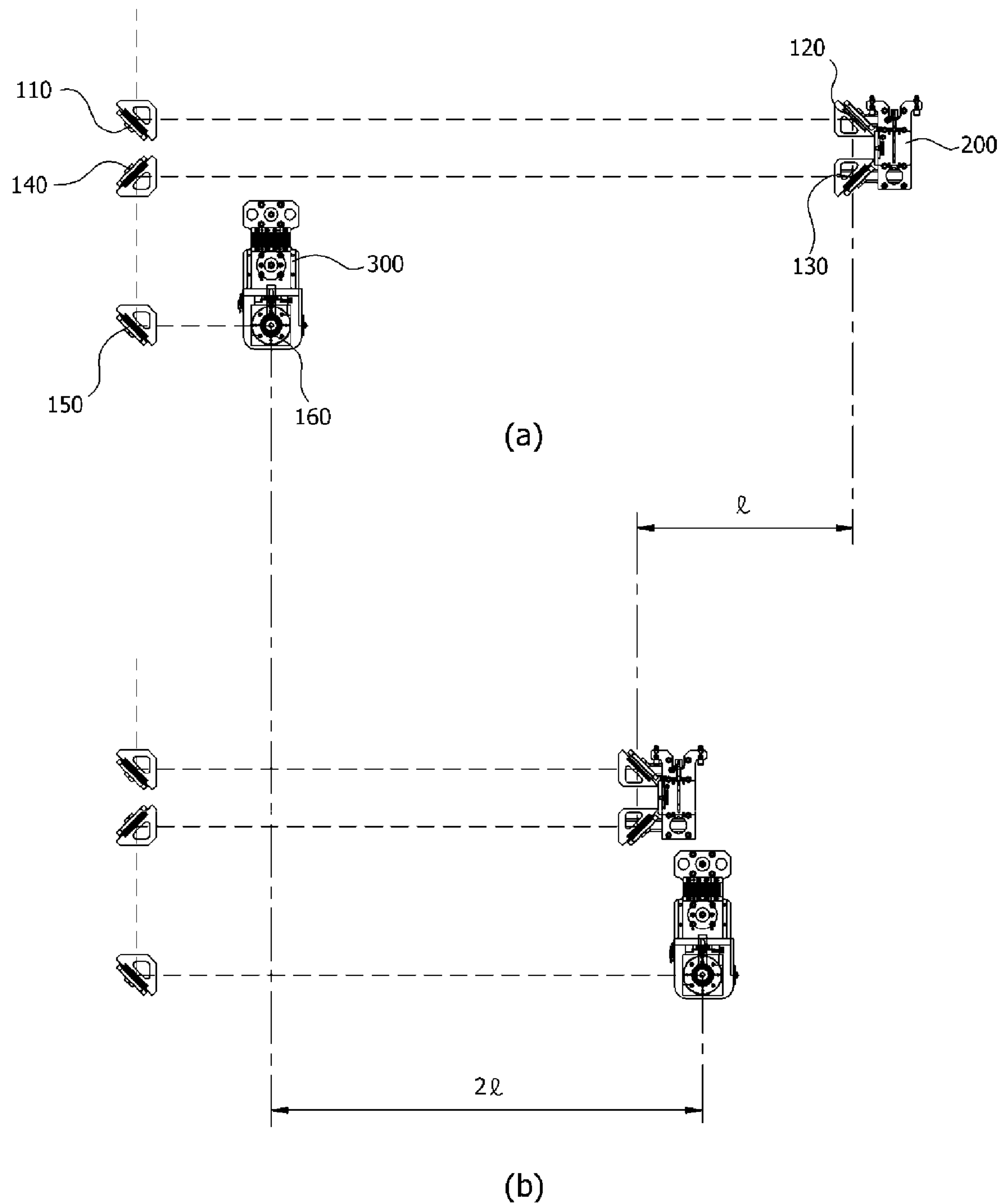
FIG. 5 is a schematic plan view illustrating a change in a light path of the embodiment of FIG. 1.

The relationship between the transport speeds of the path adjustment block 200 and the laser emitting unit 300 is described with reference to FIG. 5. While the laser emitting unit 300 in the state of (a) of FIG. 5 is transported to the right by a distance of 2I and reaches the position of (b) of FIG. 5, the path adjustment block 200 is transported to the left by a distance of I and reaches the position of (b) of FIG. 5. In this case, the distance of the entire light path through which the laser beam passes, the distance being indicated by the dotted line in FIG. 5, is maintained at a constant value regardless of the states of (a) and (b) of FIG. 5.

The ratio of transport speeds of the laser emitting unit 300 and the path adjustment block 200 as described above is established in a case where only the single path adjustment block 200 is disposed on the entire light path of the laser beam. As long as the operation principle of the present disclosure is understood, it can be seen that two or more path adjustment blocks may be installed on the light path of the laser beam. For example, in a case where the two path adjustment blocks are disposed on the light path of the laser beam, ¼ of the transport speed of the laser emitting unit is sufficient for the transport speed of each of the path adjustment blocks. Generally speaking, in a case where a plurality of path adjustment blocks are disposed on the light path, the sum of the transport speeds of the path adjustment blocks may be ½ of the transport speed of the laser emitting unit.

As described above, the distance of the light path in the laser processing apparatus for a light guide plate according to the present disclosure is able to be maintained at a constant level because the path adjustment block 200 disposed on the light path is transported in a direction in which the light path is reduced when the laser emitting unit 300 is transported in a direction in which the light path is increased, while the path adjustment block 200 is transported in a direction in which the light path is increased when the laser emitting unit 300 is transported in a direction in which the light path is reduced. Therefore, according to the above-described operation principle, it is possible to accomplish the object of the present disclosure with a different structure from that of the first embodiment illustrated in FIG. 1 to FIG. 4. For example, the operation principles of second and third embodiments as described below are the same as that of the foregoing first embodiment.

Figure 6:
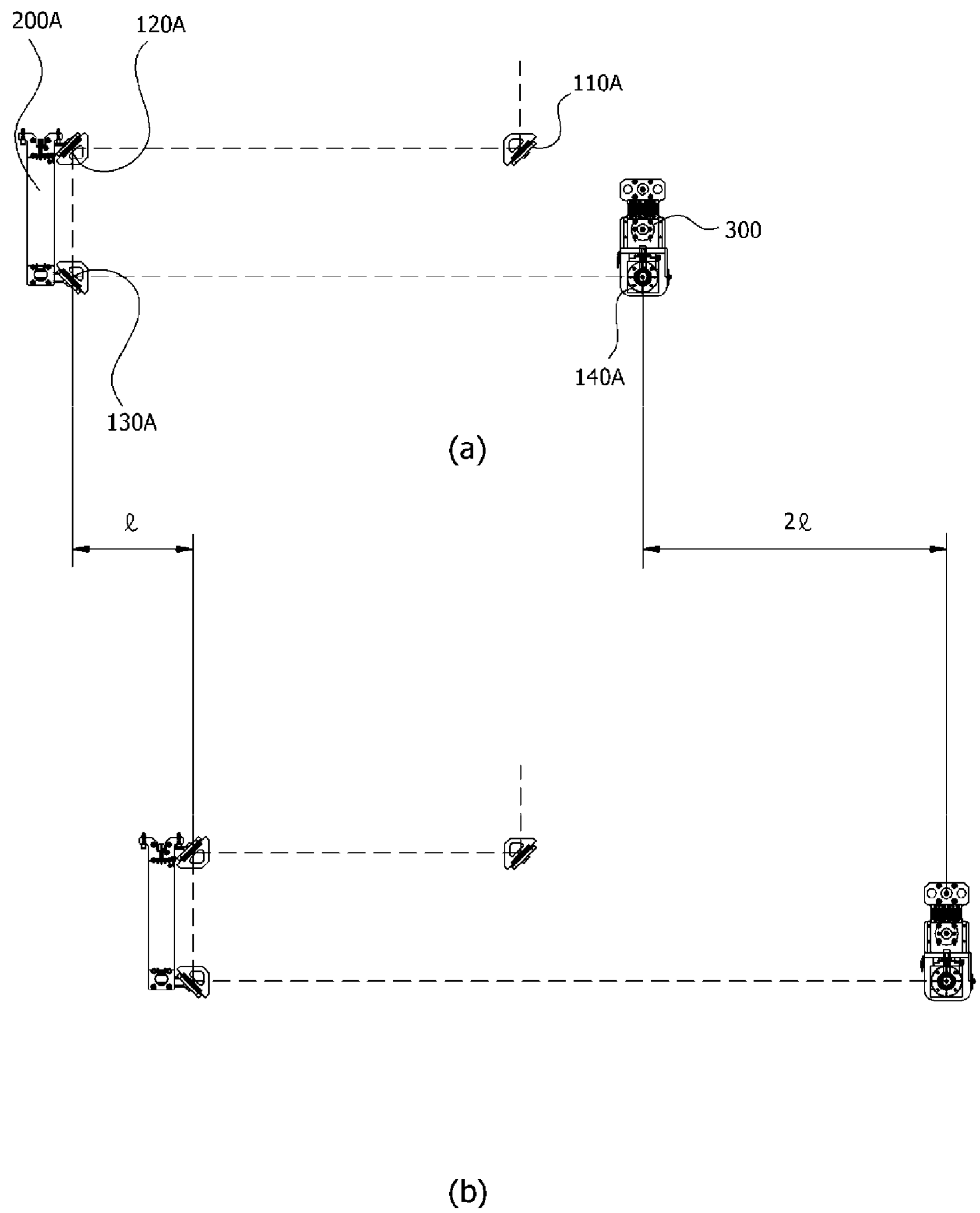
FIG. 6 is a schematic plan view illustrating a change in a light path of a second embodiment of the laser processing apparatus for a light guide plate according to the present disclosure.
Figure 7:
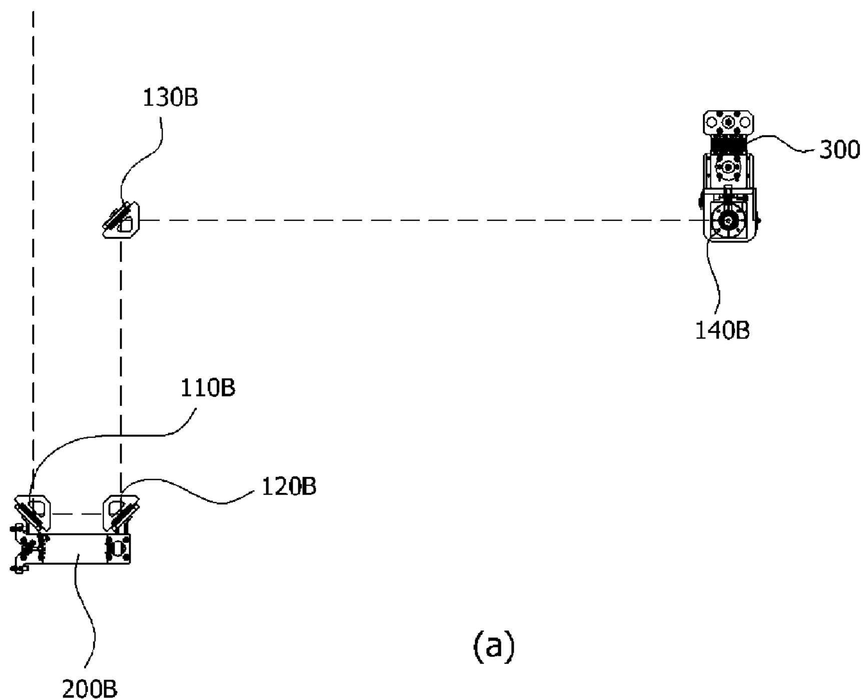
FIG. 7 is a schematic plan view illustrating a change in a light path of a third embodiment of the laser processing apparatus for a light guide plate according to the present disclosure.
Figure 7:
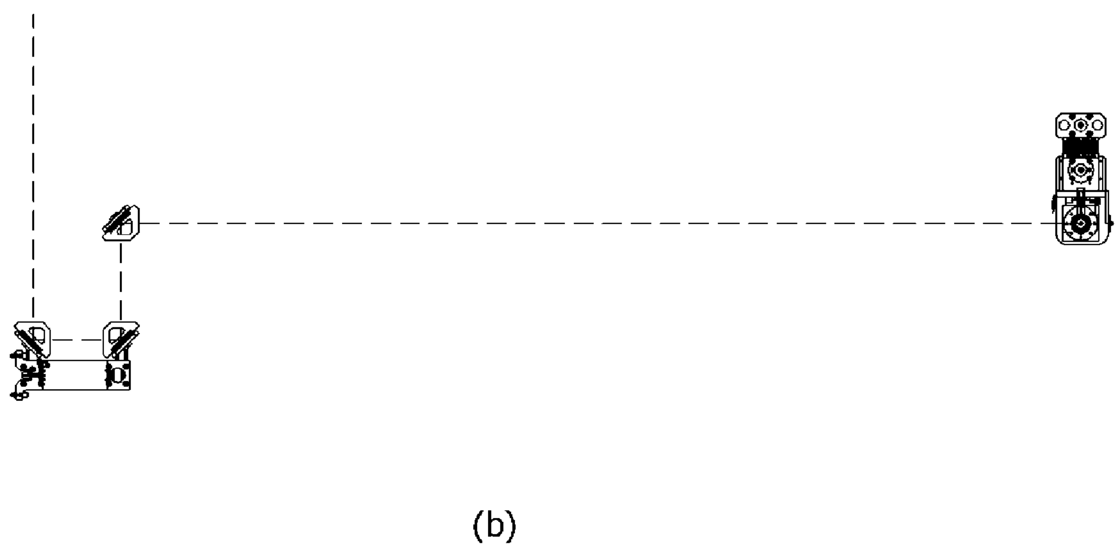
Figure 8:
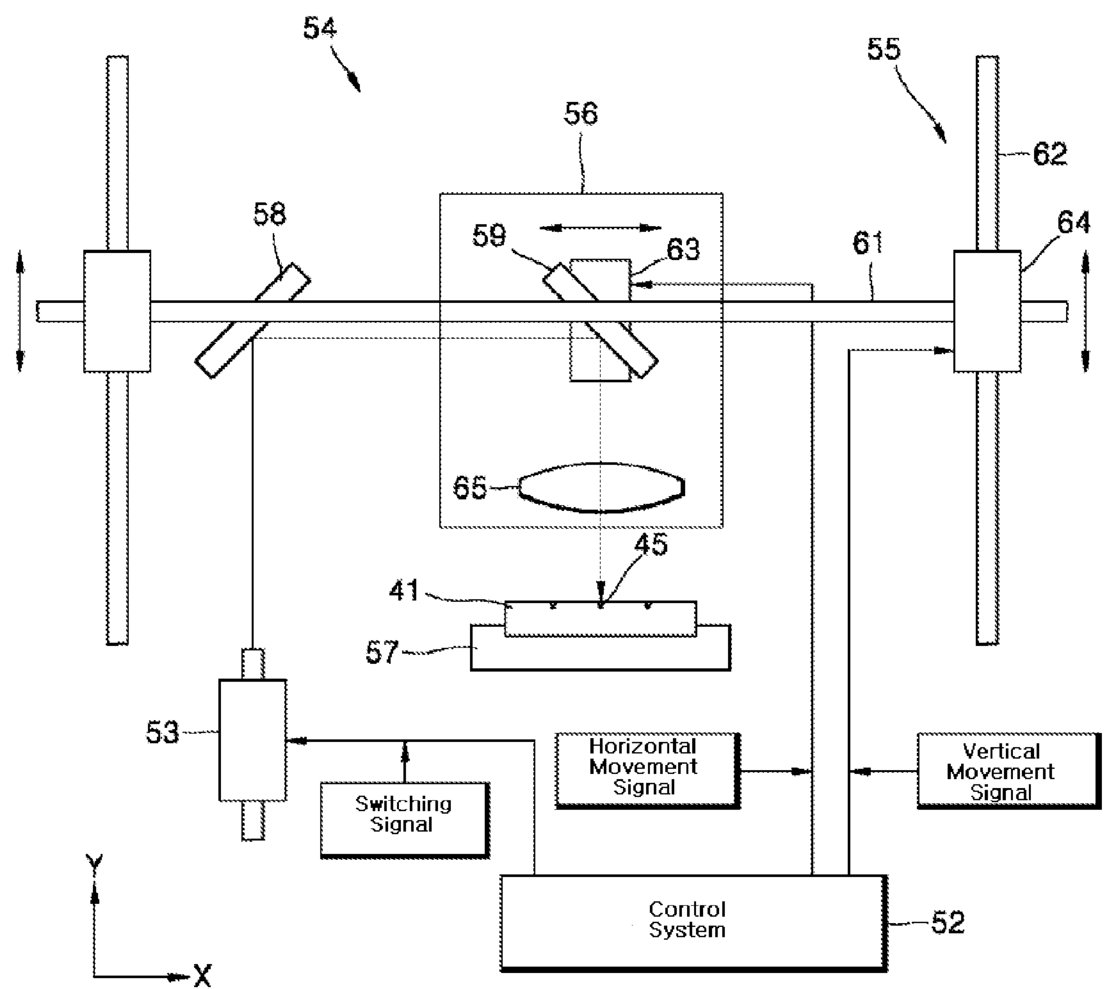
FIG. 8 is a schematic plan view illustrating an example of a laser processing apparatus for a light guide plate according to the related art.

FIGS. 6 and 7 are plan views of the second and third embodiments of the laser processing apparatus for a light guide plate according to the present disclosure, and illustrate examples in which the number of and the arrangement of reflecting mirrors and the arrangement of the path adjustment block 200 are different from those of FIG. 5.

In the second embodiment illustrated in FIG. 6, a total of four reflecting mirrors are used. In addition, a path adjustment block 200A is transported to linearly reciprocate on the same straight line as that of the laser emitting unit 300 in the same direction. That is, the path adjustment block 200A is transported on the extension line that extends from the transport path of the laser emitting unit 300.

A first reflecting mirror 110A changes the direction of the laser beam emitted by the laser oscillating unit 50 to the +90° direction to allow the laser beam to propagate toward a second reflecting mirror 120A. Both the second reflecting mirror 120A and a third reflecting mirror 130A are installed in the path adjustment block 200A to change the direction of the laser beam to the −90° direction, and a fourth reflecting mirror 140A is installed in the laser emitting unit 300 and receives the laser beam from the third reflecting mirror 130A to change the direction of the laser beam to the vertically downward direction so that the laser beam illuminates the acrylic plate.

In this example, the number of reflecting mirrors may be reduced to 4. However, a space for transporting of the path adjustment block 200A is additionally needed. Therefore, the entire width of the laser processing apparatus for a light guide plate is increased to 1.5 times that of the first embodiment at the minimum when viewed from the front. Even in this embodiment, the sum of values of changes in direction at the reflecting mirrors becomes −90°. This is because the positional relationship between the laser oscillating unit 50 and the laser emitting unit 300 is the same as that of the above-described first embodiment.

Unlike the first embodiment, the laser emitting unit 300 and the path adjustment block 200A are transported in the same direction. However, in the same manner as the first embodiment, the path adjustment block 200A has to be transported by I while the laser emitting unit 300 is transported by 2I.

A total of four reflecting mirrors are used also in the third embodiment illustrated in FIG. 7, and a path adjustment block 200B is transported to reciprocate in the vertical direction with respect to the direction in the figure in front of the laser oscillating unit 50.

A first reflecting mirror 110B and a second reflecting mirror 120B are installed in the path adjustment block 200B and change the direction of the laser beam emitted by the laser oscillating unit 50 to the −90° direction to allow the laser beam to propagate toward a third reflecting mirror 130B fixed to the frame 10. The third reflecting mirror 130B changes the propagation direction of the laser beam to the +90° direction to allow the laser beam to propagate toward a fourth reflecting mirror 140B installed in the laser emitting unit 300. The fourth reflecting mirror 140B changes the laser beam received from the third reflecting mirror 130B to the +90° direction to allow the laser beam to reach the acrylic plate positioned in the vertically downward direction.

Even in this embodiment, the number of reflecting mirrors may be reduced to 4. However, a space for transporting of the path adjustment block 200B is additionally needed. Therefore, the longitudinal length of the laser processing apparatus for a laser guide plate becomes greater than that of the first embodiment when viewed in the plan view. Even in this embodiment, the sum of values of changes in direction at the reflecting mirrors becomes −90°. This is because the positioned relationship between the laser oscillating unit 50 and the laser emitting unit 300 is the same as that of the first and second embodiments. The ratio of transport speeds of the laser emitting unit 300 and the path adjustment block 200B is obtained in the same manner as those of the foregoing embodiments.

Furthermore, although not exemplified in detail, a configuration in which the path adjustment block 200 is transported along a direction perpendicular to the surface of the figure with respect to the direction in FIG. 4 may also be employed.

Besides, in the above-described first to third embodiments, a modification in which the first reflecting mirrors 110, 110A, and 110B are removed and the laser oscillating unit 50 is directly installed at the position can be made. In addition, as in the above description of the first embodiment, a modification in which reflecting mirrors are added depending on the position of laser oscillator can be made. However, in the third embodiment, since the first reflecting mirror is disposed on the path adjustment block, when the first reflecting mirror is removed and a laser oscillator is installed at the position, the laser oscillating unit is transported, which is not advantageous compared to the case where the reflecting mirrors are transported, in consideration of an increase in the inertial force due to the weight of the laser oscillator, an increase in required driving force, an increase in vibrations, and the like.

In any of the embodiments, as a mechanical configuration for transporting the laser emitting unit 300 and the path adjustment blocks 200, 200A, 200B, a belt drive, a ball screw drive, a rack and pinion drive, or a drive using a linear motor may be used. In the case of the belt drive, the laser emitting unit 300 and the path adjustment blocks 200, 200A, 200B may be transported to linearly reciprocate in a manner of rotating pulleys engaged with belts in a state of being fixed to corresponding belts. In the case of using the ball screw drive, linear reciprocation may be implemented in such a manner that the laser emitting unit 300 and the path adjustment blocks 200, 200A, 200B are fixed to corresponding nuts and screw shafts are rotated by motors. In the case of the rack and pinion drive, linear reciprocation is possible in such a manner that the laser emitting unit 300 and the path adjustment blocks 200, 200A, 200B are fixed to racks and pinions engaged with the racks are rotated by motors. In the case of the drive using a linear motor, the laser emitting unit 300 and the path adjustment blocks 200, 200A, 200B may be fixed to the rotor of the linear motor.

Each method has its own advantages and disadvantages. For example, in the case of the ball screw drive, accurate transport control is possible. However, the transport speed is low and vibration or noise may occur due to the backlash during reciprocation. In the case of the rack and pinion drive, there is a difficulty in supporting the racks horizontally, and the backlash between the rack and the pinion is also a problem. While the ball screw drive, the rack and pinion drive, and the belt drive are able to be configured with rotary motors more simply and cheaply, the drive using the linear motor requires higher. However, mechanical configurations such as belts and pulleys, racks and pinions, and ball screws may be omitted. Here, in the case of a configuration in which the laser emitting unit 300 and the path adjustment blocks 200, 200A, 200B are transported by two linear motors, a precise control device is needed to accurately control the ratio of speed thereof to 2:1.

The belt drive has characteristics in that more accurate transport control is possible with a simpler configuration than those of the above modes. Hereinafter, the belt drive mode will be described in detail with reference to FIG. 4.

The two pairs of rails, that is, a first rail 20 and a second rail 30 are disposed on the upper surface of the frame 10 to be parallel to each other. On the first rail 20 positioned at the lower side with respect to the direction of FIG. 4, the laser emitting unit 300 is placed and is installed to able to slide along the direction of the rail. The path adjustment block 200 is placed on the second rail 30 positioned at the upper side and is installed to be able to also slide along the direction of the rail. The first and the second rails 20, 30 have a role of steadily and stably supporting the laser emitting unit 300 and the path adjustment block 200, respectively, during linear reciprocation.

A first pulley 410 and a second pulley 420 are installed at both ends of the first rail 20 and a belt 510 is suspended over the first and the second pulleys 410, 420. As described below, the belt 510 is directly driven by a driving motor 400 and is thus referred to as a driving belt 510.

In the same manner, a third pulley 430 and a fourth pulley 440 are installed both ends of the second rail 30 and another belt 520 is suspended over the third and fourth pulleys 430, 440. The belt 520 receives a driving force from the driving belt 510 and is thus referred to as a driven belt 520.

The first pulley 410 is rotated by the driving motor 400 and is thus referred to as a driving pulley. The remaining second, third, and fourth pulleys 420, 430, 440 do not directly receive the rotational driving force and are thus referred to as idler pulleys. When the first pulley 410 is driven to rotate, the second pulley 420 is also rotated by the driving belt 510. Here, the third pulley 430 is installed to be mechanically linked with the second pulley 420, and the rotating shafts of pulleys may be engaged with each other by a gear or the like. However, the simplest form is to allow the third pulley 430 and the second pulley 420 to share the same rotating shaft. In this case, the third and second pulleys 430, 420 rotate together, and the third pulley 430 has a function of a driving pulley for the driven belt 520. Accordingly, a configuration in which the fourth pulley 440 is also rotated by the driven belt 520 is completed.

The laser emitting unit 300 is fixed to the driving belt 510, and the path adjustment block 200 is fixed to the driven belt 520. The rotational directions of driving belt 510 and the driven belt 520 are the same, but the laser emitting unit 300 and the path adjustment block 200 have to be transported in the opposite direction to each other. This requires a countermeasure. For this, the laser emitting unit 300 is fixed to the upper side of the driving belt 510, and the path adjustment block 200 is fixed to the lower side of the driven belt 520. This is a distinguishment reference that can be made because the driving belt 510 and the driven belt 520 are driven by the pulleys rotating on the horizontal rotating shafts. Generally, when a part of the belt which goes toward the driving pulley is called a tight side and a part of the belt which comes out of the driving pulley is called a slack side, for example, the laser emitting unit 300 has to be fixed to the tight side of the driving belt 510 and the path adjustment block 200 has to be fixed to the tight side of the driven belt 520. The opposite case is also possible. Here, in the case of the driven belt 520, it is apparent that the tight side and the slack side thereof are distinguished from each other as the third pulley 430 is designated as the driving pulley.

Meanwhile, in the case where the second pulley 420 and the third pulley 430 share the rotating shaft, when the diameter of the second pulley 420 becomes two times the diameter of the third pulley 430, the transport speed of the driving belt 510 becomes two times the transport speed of the driven belt 520. This is because two times the transport distance of the path adjustment block 200 is reflected although the transport distance of the laser emitting unit 300 is reflected in the distance of the entire light path of the laser beam as it is. That is, when the laser emitting unit 300 is transported by 1 m in one direction, if the path adjustment block 200 is transported by 0.5 m in the opposite direction for the same time, the distance of the entire light path through which the laser beam passes may be maintained at a constant level. Meanwhile, for a distance by which the path adjustment block 200 is able to be transported according to the same principle, that is, for the distance between the third pulley 430 and the fourth pulley 440, a distance by which the laser emitting unit 300 is able to be transported, that is, ½ or greater of the distance between the first pulley 410 and the second pulley 420 is sufficient.

As described above, the configuration in which the pair of pulleys share the rotating shaft in order to transmit a driving force between the driving belt and the driven belt may also be applied to the second embodiment as well as the first embodiment. That is, in the second embodiment illustrated in FIG. 6, a single rotating shaft may be disposed between the belt to which the laser emitting unit 300 is fixed and the belt to which the path adjustment block 200A is fixed, and two pulleys may be installed on the rotating shaft to be engaged with the belt on the laser emitting unit 300 side and the belt on the path adjustment block 200A side. Here, the ratio of the diameters of the two pulleys is also 2:1 as in the first embodiment, and the laser emitting unit 300 and the path adjustment block 200A are fixed to the tight sides of the respective belts to be transported in the same direction, or conversely, are fixed to the slack sides of the respective belts, as in the first embodiment. In the case of the third embodiment, the pair of adjacent pulleys of the belt to which the laser emitting unit 300 is fixed and the belt having the path adjustment block 200B installed therein have orthogonal rotating shafts to each other, and thus a linkage unit such as a bevel gear has to be separately provided.

As described above, since the distance of the light path is maintained at a constant level by the belt drive in the laser processing apparatus for a light guide plate according to the present disclosure, it is possible to accurately maintain the ratio of the transport speeds of the laser emitting unit 300 fixed to the driving belt 510 and the path adjustment block 200 fixed to the driven belt 520 at 2:1 and thus maintain the distance of the light path at a constant level without an expensive device such as a linear motor or a complex control mechanism. In addition, transport speeds higher than that of the ball screw may be ensured even by a driving motor having the same capacity.

Both the above driving belt 510 and the driven belt 520 may be timing belts for accurate position control of the laser emitting unit 300 and the path adjustment block 200. In this case, each of pulleys has to be a timing pulley having teeth formed on the outer peripheral surface, and the fact that the diameter of the second pulley 420 is two times the diameter of the third pulley 430 means that the number of teeth of the second pulley 420 is two times the number of teeth of the third pulley 430.

In order to adjust the cross-sectional diameter of the laser beam or focus the laser beam on a single point, an optical lens may be disposed on the light path on which the laser beam propagates as needed. The optical lens may be disposed at a position before the laser beam from the laser oscillating unit 50 enters the first reflecting mirror 110 or at a position before laser beam from the laser emitting unit 300 enter the processing object from the sixth reflecting mirror 160 (the fourth reflecting mirrors 140A, 140B in the second and third embodiments), and the number of optical lenses may be controlled as needed. In addition, the optical lens 60 may be a single lens or may be a lens group made by combining convex lenses and concave lenses. In each of the embodiments, as illustrated in FIG. 2, the optical lens 60 is installed at a position before the laser beam enters the acrylic plate which is the processing object after the sixth reflecting mirror 160, that is, in the laser emitting unit 300.

The embodiments of the present disclosure described above and illustrated in the drawings should not be construed as limiting the technical spirit of the present disclosure. The protection range of the present disclosure is limited only by the claims, and improvements and modifications of the technical spirit of the present disclosure in various forms can be made by those skilled in the art of the present disclosure. Therefore, such improvements and modifications belong to the protection range of the present disclosure as long as the improvement and modifications are apparently understood by those skilled in the art.

We claim:

1. A laser processing apparatus for a light guide plate comprising:

a frame;

a laser oscillating device which generates a laser beam and is fixedly disposed on the frame;

a laser emitting device which is transported to linearly reciprocate on the frame, and receives the laser beam from the laser oscillating device to emit the laser beam and form a predetermined pattern on a light guide plate which is a processing object;

a laser transmitting unit which forms a transmission path of the laser beam between the laser emitting device and the laser oscillating device; and a transport surface plate which is transported to linearly reciprocate in a direction intersecting a transport direction of the laser emitting device on the frame and supports the light guide plate which is the processing object, wherein the laser transmitting unit includes a plurality of reflecting mirrors that reflect the laser beam and a path adjustment block that is transported in a direction in which a distance of the light path is reduced when the laser emitting device is transported in a direction in which the distance of the light path is increased, and at least one of the plurality of reflecting mirrors is disposed in the path adjustment block, and wherein a transport speed of the path adjustment block is ½ of a transport speed of the laser emitting device.

2. The laser processing apparatus for a light guide plate according to claim 1, wherein the path adjustment block of the laser transmitting unit is transported in the opposite direction on a straight line parallel to the transport direction of the laser emitting device, when a propagation direction of the laser beam is 0°, the plurality of reflecting mirrors of the laser transmitting unit includes a first reflecting mirror that is disposed on the frame and reflects the laser beam emitted by the laser oscillating device in a −90° direction, a second reflecting mirror that is disposed in the path adjustment block and reflects the laser beam from the first reflecting mirror in a +90° direction, a third reflecting mirror that is disposed in the path adjustment block and reflects the laser beam from the second reflecting mirror in the +90° direction, a fourth reflecting mirror that is disposed on the frame and reflects the laser beam from the third reflecting mirror in the −90° direction, a fifth reflecting mirror that is disposed on the frame and reflects the laser beam from the fourth reflecting mirror in the −90° direction, and a sixth reflecting mirror that is disposed in the laser emitting device and reflects the laser beam from the fifth reflecting mirror in the +90' direction, and the first, second, third, fourth, and fifth reflecting mirrors reflect the laser beam in a same single plane, and the sixth reflecting mirror reflects the laser beam in a plane perpendicular to the same single plane.

3. The laser processing apparatus for a light guide plate according to claim 1, wherein the path adjustment block of the laser transmitting unit is transported in a same direction on a same straight line as the laser emitting device, when a propagation direction of the laser beam is 0°, the plurality of reflecting mirrors of the laser transmitting unit includes a first reflecting mirror that is disposed on the frame and reflects the laser beam emitted by the laser oscillating device in a +90° direction, a second reflecting mirror that is disposed in the path adjustment block and reflects the laser beam from the first reflecting mirror in a −90° direction, a third reflecting mirror that is disposed in the path adjustment block and reflects the laser beam from the second reflecting mirror in the −90° direction, and a fourth reflecting mirror that is disposed in the laser emitting device and reflects the laser beam from the third reflecting mirror in the +90° direction, and the first, second, and third reflecting mirrors reflect the laser beam in a same single plane, and the fourth reflecting mirror reflects the laser beam in a plane perpendicular to the same single plane.

4. The laser processing apparatus for a light guide plate according to claim 1, wherein the path adjustment block of the laser transmitting unit is transported on a straight line at a right angle to the transport direction of the laser emitting device, when a propagation direction of the laser beam is 0°, the plurality of reflecting mirrors of the laser transmitting unit includes a first reflecting mirror that is disposed in the path adjustment block and reflects the laser beam from the laser oscillating device in a −90° direction, a second reflecting mirror that is disposed in the path adjustment block and reflects the laser beam from the first reflecting mirror in the −90° direction, a third reflecting mirror that is disposed on the frame and reflects the laser beam from the second reflecting mirror in a +90° direction, and a fourth reflecting mirror that is disposed in the laser emitting device and reflects the laser beam from the third reflecting mirror in the +90° direction, and the first, second, and third reflecting mirrors reflect the laser beam in a same single plane, and the fourth reflecting mirror reflects the laser beam in a plane perpendicular to the same single plane.

5. The laser processing apparatus for a light guide plate according to any one of claims 1 to 4, wherein each of the laser emitting device and the path adjustment block is transported by one driving method selected from a belt drive, a ball screw drive, a rack and pinion drive, and a drive using a linear motor.

6. The laser processing apparatus for a light guide plate according to claim 2 or 3, wherein each of the laser emitting device and the path adjustment block is transported by being fixed to a timing belt suspended between a pair of pulleys.

7. The laser processing apparatus for a light guide plate according to claim 6, wherein a driving belt to which the laser emitting device is fixed is suspended between a first pulley and a second pulley, a driven belt to which the path adjustment block is fixed is suspended between a third pulley and a fourth pulley, the first pulley is driven to rotate by a driving motor, the second pulley and the third pulley are rotated integrally, a diameter of the second pulley is two times a diameter of the third pulley, a distance between the third pulley and the fourth pulley is equal to or greater than ½ of a distance between the first pulley and the second pulley, and the laser emitting device and the path adjustment block are respectively fixed to a tight side of the driving belt and a tight side of the driven belt, or are respectively fixed to a slack side of the driving belt and a slack side of the driven belt.

* * * * *